United States Patent
Geary et al.

(10) Patent No.: US 9,233,756 B2
(45) Date of Patent: *Jan. 12, 2016

(54) SYSTEM AND METHOD FOR AIRCRAFT CABIN ATMOSPHERIC COMPOSITION CONTROL

(75) Inventors: Robert Geary, Savannah, GA (US); Jason Marc Stevenson, Savannah, GA (US)

(73) Assignee: Gulfstream Aerospace Corporation, Savannah, GA (US)

(*) Notice: Subject to any disclaimer, the term of this patent is extended or adjusted under 35 U.S.C. 154(b) by 843 days.

This patent is subject to a terminal disclaimer.

(21) Appl. No.: 13/155,702

(22) Filed: Jun. 8, 2011

(65) Prior Publication Data

US 2012/0196521 A1    Aug. 2, 2012

Related U.S. Application Data

(63) Continuation of application No. 10/708,217, filed on Feb. 17, 2004, now Pat. No. 8,015,973.

(60) Provisional application No. 60/447,627, filed on Feb. 15, 2003.

(51) Int. Cl.
    *A62B 7/14*          (2006.01)
    *B64D 13/06*      (2006.01)

(52) U.S. Cl.
    CPC ........ *B64D 13/06* (2013.01); *B64D 2013/0681* (2013.01)

(58) Field of Classification Search
    USPC .......... 128/204.29, 202.22; 244/118.5, 121.1, 244/1 R, 171.9; 62/652, 654, 655, 656, 657; 454/70–75; 95/11, 12, 96, 106, 130, 95/138; 96/111, 115, 130, 134, 142, 143
See application file for complete search history.

(56) References Cited

U.S. PATENT DOCUMENTS

| | | | |
|---|---|---|---|
| 4,032,757 A | 6/1977 | Eccles | |
| 4,130,241 A | 12/1978 | Meredith et al. | |

(Continued)

FOREIGN PATENT DOCUMENTS

| | | |
|---|---|---|
| DE | 4227157 | 11/1994 |
| EP | 0808769 A2 | 11/1997 |

(Continued)

OTHER PUBLICATIONS

European Patent Office, European Patent Application; International Appln. No. 97303441.6, filed May 20, 1997.

*Primary Examiner* — Ophelia A Hawthorne

(74) *Attorney, Agent, or Firm* — Ingrassia, Fisher & Lorenz PC

(57) ABSTRACT

Method and arrangement for adjusting nitrogen and oxygen concentrations within regions of an aircraft. The method includes separating nitrogen from ambient air onboard an aircraft thereby establishing a high-concentration nitrogen supply and then dispensing high-concentration nitrogen from the supply to a fire-susceptible, non-habitable region of the aircraft where the high-concentration nitrogen is reservoired thereby decreasing the capability for the atmosphere therein to support combustion. Oxygen is also separated from the ambient air thereby establishing a high-concentration oxygen supply that is dispensed to an occupant cabin of the aircraft thereby increasing the level of oxygen concentration within the cabin to a level greater than the naturally occurring concentration of oxygen at the experienced internal cabin pressure. When it is determined that reduced oxygen concentration is required in the occupant cabin, the reservoired high-concentration nitrogen is moved into the passenger cabin diluting the oxygen-elevated environment.

13 Claims, 9 Drawing Sheets

(56) References Cited

U.S. PATENT DOCUMENTS

| | | |
|---|---|---|
| 4,198,017 A | 4/1980 | Murray |
| 4,236,685 A | 12/1980 | Kissel |
| 4,363,098 A | 12/1982 | Buus et al. |
| 4,370,706 A | 1/1983 | Doniger et al. |
| 4,504,233 A | 3/1985 | Galus et al. |
| 4,517,639 A | 5/1985 | Ferrell et al. |
| 4,533,097 A | 8/1985 | Aldrich |
| 4,542,679 A | 9/1985 | Murphy et al. |
| 4,598,292 A | 7/1986 | Devino |
| 4,626,851 A | 12/1986 | Tooze |
| 4,644,538 A | 2/1987 | Cooper et al. |
| 4,652,417 A | 3/1987 | Sutherland et al. |
| 4,672,529 A | 6/1987 | Kupersmit |
| 4,807,516 A | 2/1989 | Takats |
| 4,811,230 A | 3/1989 | Graham et al. |
| 4,887,214 A | 12/1989 | Takats et al. |
| 5,012,423 A | 4/1991 | Osder |
| 5,062,594 A | 11/1991 | Repperger |
| 5,076,517 A | 12/1991 | Ferranti et al. |
| 5,091,847 A | 2/1992 | Herbermann |
| 5,264,768 A | 11/1993 | Gregory et al. |
| 5,274,554 A | 12/1993 | Takats et al. |
| 5,347,204 A | 9/1994 | Gregory et al. |
| 5,374,014 A | 12/1994 | Traverse et al. |
| 5,383,133 A | 1/1995 | Staple |
| 5,412,299 A | 5/1995 | Gregory et al. |
| 5,473,235 A | 12/1995 | Lance et al. |
| 5,493,497 A | 2/1996 | Buus |
| 5,515,282 A | 5/1996 | Jackson |
| 5,527,002 A | 6/1996 | Bilange et al. |
| 5,559,415 A | 9/1996 | Gregory et al. |
| 5,634,794 A | 6/1997 | Hildreth et al. |
| 5,668,542 A | 9/1997 | Wright |
| 5,670,856 A | 9/1997 | Le et al. |
| 5,694,014 A | 12/1997 | Hegg et al. |
| 5,735,490 A | 4/1998 | Berthet et al. |
| 5,743,490 A | 4/1998 | Gillingham et al. |
| 5,791,982 A * | 8/1998 | Curry et al. ............ 454/74 |
| 5,806,805 A | 9/1998 | Elbert et al. |
| 5,806,806 A | 9/1998 | Boehringer et al. |
| 5,875,998 A | 3/1999 | Gleine et al. |
| 5,881,971 A | 3/1999 | Hickman |
| 5,911,390 A | 6/1999 | Pohling |
| 5,978,715 A | 11/1999 | Briffle et al. |
| 6,000,662 A | 12/1999 | Todeschi et al. |
| 6,038,498 A | 3/2000 | Briffle et al. |
| 6,064,923 A | 5/2000 | Bilange et al. |
| 6,082,672 A | 7/2000 | Audren |
| 6,112,141 A | 8/2000 | Briffle et al. |
| 6,128,554 A | 10/2000 | Damotte |
| 6,189,836 B1 | 2/2001 | Gold et al. |
| 6,381,519 B1 | 4/2002 | Snyder |
| 6,443,399 B1 | 9/2002 | Yount et al. |
| 6,459,228 B1 | 10/2002 | Szulyk et al. |
| 6,561,463 B1 | 5/2003 | Yount et al. |
| 6,573,672 B2 | 6/2003 | O'Rourke et al. |
| 6,622,972 B2 | 9/2003 | Urnes et al. |
| 6,648,599 B2 | 11/2003 | Preissler |
| 6,650,973 B2 | 11/2003 | Yamamoto |
| 6,693,558 B2 | 2/2004 | Hedrick |
| 6,704,624 B2 | 3/2004 | Ortega et al. |
| 6,735,500 B2 | 5/2004 | Nicholas et al. |
| 6,791,476 B1 | 9/2004 | Hedrick |
| 6,796,526 B2 | 9/2004 | Boehringer |
| 6,799,739 B1 | 10/2004 | Jones |
| 6,842,672 B1 | 1/2005 | Straub et al. |
| 6,860,452 B2 | 3/2005 | Bacon et al. |
| 6,867,711 B1 | 3/2005 | Langner et al. |
| 6,997,970 B2 * | 2/2006 | Crome ................ 95/8 |
| 7,012,553 B2 | 3/2006 | Hedrick |
| 7,179,322 B2 * | 2/2007 | Lyons et al. ............ 95/47 |
| 8,015,973 B2 * | 9/2011 | Geary ............ 128/204.29 |
| 2002/0065582 A1 | 5/2002 | Morrison et al. |
| 2003/0127569 A1 | 7/2003 | Bacon et al. |
| 2004/0078120 A1 | 4/2004 | Melkers et al. |
| 2004/0078121 A1 | 4/2004 | Cartmell et al. |
| 2004/0098140 A1 | 5/2004 | Hess |
| 2004/0195460 A1 | 10/2004 | Sailer |
| 2004/0238688 A1 | 12/2004 | Audren |
| 2007/0164166 A1 | 7/2007 | Hirvonen et al. |
| 2007/0164168 A1 | 7/2007 | Hirvonen et al. |
| 2009/0128366 A1 | 5/2009 | Firra et al. |

FOREIGN PATENT DOCUMENTS

| | | |
|---|---|---|
| JP | 10059293 | 3/1998 |
| WO | WO 9529434 | 11/1995 |

\* cited by examiner

Top Level O2/N2 Control Logic/Function Table

| CSD | BSD | USD | WOW | SO2 | P$_P$O2 =/> Target | Ckpt Sw On | Function |
|---|---|---|---|---|---|---|---|
|  |  |  |  |  |  | X | • Separators on<br>• O2 to distribution<br>• Dedicated return fan-forward |
|  |  |  |  |  | X | X | Separators off, air supply and RAM air valves to 'system off configuration' |
| X |  |  |  |  |  |  | • Separators on<br>• O2 ducted overboard<br>• Proportional valve to N2 production<br>• Dedicated return air fan reversed<br>• Once cabin is at 20.95% O2, if N2 fire suppression with passengers on mask O2 is not approved, system should continue in N2 Production mode, regulating cabin O2 to the unassisted breathing safe certification limit until flight crew turns the system off.<br>• If cabin N2 fire suppression is approved with passengers on mask O2, system should continue in N2 production mode, regulating the cabin to the passengers on mask safe certification limit |
|  | X |  |  |  |  |  | • Separators on<br>• O2 ducted overboard<br>• Proportional valve to N2 production<br>• Open baggage N2 Valve<br>• Crew turns system off before entering baggage (if baggage is accessible) to finish suppressing fire |
|  |  | X |  |  |  |  | • Separators on<br>• O2 ducted overboard<br>• Dedicated return air fan off<br>• Proportional valve to N2 production, regulate underfloor area to fire suppression level until flight crew turns the system off |

FIG. 10

| | | | | |
|---|---|---|---|---|
| | | | X | • Separators on<br>• O2 ducted overboard<br>• Proportional valve to N2 production<br>• Split N2 enriched stream between baggage compartment and cabin underfloor area, regulating baggage compartment to suppression level ppO2 and cabin underfloor area toward suppression level (priority to baggage area), until flight crew turns system off<br>• Dedicated return air fan reversed<br>• Once cabin is at 20.95% O2, if N2 fire suppression with passengers on mask O2 is not approved, system should continue in N2 Production mode, regulating cabin O2 to the unassisted breathing safe certification limit until flight crew turns the system off<br>    • If cabin N2 fire suppression is approved with passengers on mask O2, system should continue in N2 production mode, regulating the cabin to the passengers on mask safe certification limit |
| X | X | | X | • Separators on<br>• O2 ducted overboard<br>• Proportional valve to N2 production<br>• Split N2 enriched stream between baggage compartment and cabin underfloor area, regulating baggage compartment and cabin underfloor area to suppression level, until flight crew turns system off<br>• Dedicated return air fan off<br>• Once cabin is at 20.95% O2, if N2 fire suppression with passengers on mask O2 is not approved, system should continue in N2 Production mode, regulating cabin O2 to the unassisted breathing safe certification limit until flight crew turns the system off.<br>    • If cabin N2 fire suppression is approved with passengers on mask O2, system should continue in N2 Production mode, regulating the cabin to the passengers on mask safe certification limit |

FIG. 10 (Continued)

| | | | |
|---|---|---|---|
| X | | | • Separators on<br>• O2 ducted overboard<br>• Proportional valve to N2 production<br>• Split N2 enriched stream between baggage compartment and cabin underfloor area, regulating baggage compartment and cabin underfloor area to suppression level, until flight crew turns system off<br>• Dedicated return air fan reversed |
| | X | X | Separators off, Tap off air and RAM air valves to system off configuration |
| | X | | Separators on, SO2 valves to SO2, N2 to normal underfloor distribution |
| | | X | Separators on, SO2 valves to SO2, N2 to overboard |

FIG. 10 (Continued)

SYSTEM AND METHOD FOR AIRCRAFT CABIN ATMOSPHERIC COMPOSITION CONTROL

CROSS REFERENCE TO RELATED APPLICATIONS

The present application is a continuation of U.S. patent application Ser. No. 10/708,217, now U.S. Pat. No. 8,015,973, which was filed on Feb. 17, 2004 and claims the benefit of U.S. Provisional Application No. 60/447,627 filed on Feb. 15, 2003, pursuant to 37 CFR 1.53(c).

BACKGROUND OF INVENTION

1. Technical Field

The present invention relates to systems and methods for selective control of the balance between nitrogen and oxygen content in the air in habitable and non-habitable areas of pressurized spaces within aircraft. More particularly, the invention relates to systems to alter the balance between oxygen and nitrogen in different areas of aircraft to create zones where the atmospheric composition more properly supports the needs of the zones. The invention accomplishes this zonal composition optimization by directing a higher percentage of the oxygen available in the air entering the aircraft into the habitable areas, while directing a higher percentage of the available nitrogen in the air into the non-habitable areas, especially those areas of greater flammability risk and/or limited access in case of fire.

2. Background Information

The reduced air pressure available in pressurized aircraft cabins results in molecular concentrations of oxygen that are far lower than those for which most passengers are physiologically adapted. This causes reduced levels of blood and tissue oxygenation (see FIGS. 1 and 2) and the initiation of physiological changes related to the body's efforts to compensate and adapt. The resulting physiological stresses include reduced respiratory effectiveness, compensatory increases in heart and respiration rates, increased levels of blood clotting factors, and increased production of red blood cells. These physiological changes result in, or contribute to, a variety of negative impacts, including but not limited to fatigue, reduced mental and physical performance, drowsiness, impaired visual acuity, impaired sleep, and possibly the formation of blood clots. In fact, it is well accepted that visual acuity has begun to fall off as early as 7500 feet, yet commercial airlines are legally permitted to maintain pressures equivalent to 8000 feet within the aircraft. As such, a certain compromise in the flight crew's capabilities have been determined acceptable, though not desirable. The present invention provides methods and systems for reducing, if not obviating, these and other detrimental affects suffered by passengers and flight crew on civilian aircraft.

Standard atmospheric pressure at sea level is 14.7 psia. The corresponding oxygen pressure (partial-pressure) at sea level is approximately 3.07 psia. When atmospheric pressure is reduced, air expands and the molecular concentration of oxygen and the other gases that make up air are proportionately reduced according to Dalton's Law.

Pressurized aircraft cabins provide air pressures ranging from approximately 10.91 psia (8000 ft equivalent cabin altitude) to 11.78 psia (6000 ft equivalent cabin altitude) when the aircraft are operating at their maximum cruise altitudes. These reduced cabin pressures result in oxygen partial pressures ranging (approximately) from 2.286 to 2.468 psia.

Aircraft pressurization systems maintain cabin pressure levels that allow passenger and crew habitation while the aircraft flies at altitudes far above those at which human beings could otherwise survive. Current pressurization systems maintain cabin air pressures between 74-80% of the standard sea level atmospheric pressure.

As a prophylactic against unexpected low-pressure experiences, and consequently low-oxygen conditions which could adversely affect performance, cockpit crew members are provided with pressure demand oxygen masks for use when the aircraft is unable to maintain adequate pressurization. The sources of direct oxygen may also be used in case smoke fills the cockpit, or under certain other scenarios as required by civil aviation regulations.

Emergency oxygen is provided in the passenger cabin in the form of drop down masks that activate automatically when air pressure in the cabin falls to levels at which passenger safety is at imminent risk. Therapeutic oxygen outlets are sometimes provided for use by passengers who require continuous supplemental oxygen due to medical conditions. Aircraft are also often equipped with portable "walk-around" oxygen bottles for the crew to use during brief periods when their duties require them to leave their seats while the aircraft is experiencing pressurization problems. A common problem of all of these supplemental oxygen delivery systems, however, is that they require tubes connected between an oxygen source and the delivery mask for the user. Such tubes, like other cords in the occupied compartments of an aircraft, have been recognized as hazards, particularly in emergency situations. It can be imagined that in an emergency situation where the environment is already chaotic, the deployment of potentially entangling oxygen delivery tubes and masks, including their elastic securement straps, detrimentally impacts the cabin environment.

As indicated above, conventional wisdom in aircraft design has focused on pressurization with regard to increasing the habitability of aircraft cabins. Traditionally, aircraft are pressured toward a sea-level equivalent; but in actuality, altitude equivalents on the order of 6000 to 8000 feet are actually achieved. Resultantly, a corresponding decrease in oxygen concentration has been accepted. Because these corresponding oxygen concentrations are generally suitable for maintaining perceivable occupant comfort, little attention has been directed toward consequential affects suffered by cabin occupants.

"Perceived comfort" is addressed because most passengers are unaware that certain physiological changes take place responsive to reduced oxygen concentration experienced onboard aircraft, including increased respiratory and heart rates. It is for this reason that many persons are advised not to fly. For instance, persons who have recently undergone surgery which makes them particularly vulnerable to these physiological changes may be advised not to fly. Still further, persons having predispositions to such ailments as heart attacks and strokes are often advised not to fly by their medical caretakers. Elderly persons, and others with unappreciated risk factors for such ailments do fly, but resultantly place themselves at undue risk of suffering a debilitating, or life-threatening incident. It is known that the decreased concentration of oxygen in aircraft have the potential for contributing to these incidents, but as discussed above, aircraft pressurization limitations have been heretofore viewed as a limiting constraint against their remedy.

The focus on pressure is due, at least in part, to the fact that airframes are not designed to accept greater levels of pressurization, which in turn produce greater differential pressures across the fuselage skin. In fact, this limitation associated with the airframe's capabilities to endure greater pressure differentials thereacross has traditionally imposed reduced oxygen levels on passengers because of the heretofore accepted limitation on pressurization. Still further, aircraft operators are resistant to increasing interior pressurization because it significantly increases operating costs and limits aircraft performance.

Deep Vein Thrombosis (DVT), a syndrome or condition which has recently garnered increased attention with respect to airline travel, poses significant risk to cabin occupants, as well as those businesses that are tied in with the industry. Because the incidence of deep vein thrombosis has caught the eye of the public, the press has capitalized thereupon and dubbed the syndrome as "economy class syndrome." Heretofore, the focus has been on the confining and cramped nature of airline seats, particularly in economy class, and the restrictions that are resultantly imposed upon passenger mobility. Certain studies, however, have indicated that the cramped nature of smaller seats only contribute to the inducement of deep van thrombosis rather than cause it. In fact, those same studies tend to indicate that this malady stems primarily from other conditions experienced during airline travel.

Those factors which are either known or expected to contribute to the inducement of deep vein thrombosis include mobility restrictions which correspondingly reduce blood flow movements thereby placing a person at higher risk for forming blood clots, dehydration caused by the dry interior atmosphere of the aircraft and which can be exacerbated by the diuretic-effects of alcohol, and pressure related aspects. An increased tendency to develop blood clots as a result of conditions on an airliner are the hallmark of this syndrome. One aspect of great importance, but which has attracted less attention, is physiological effects caused by altitude adaptation. When exposed to reduced pressure and a corresponding reduction in oxygen concentration, the body immediately attempts to compensate. This phenomenon is well appreciated at least by athletes who often train at high altitudes to enhance their performance at lower altitudes. It is known that the body adjusts by making certain physical changes. Among others, the concentration of red blood cells is increased thereby improving the capacity for carrying oxygen. For airline passengers, the effect, however, is detrimental. It has been observed that persons who are exposed to the reduced pressure and oxygen levels that are experienced in-flight have a substantially immediate increase in certain clotting factors within their blood. This increase has been measured to vary between three and eight times the level present in persons immediately before flight. Such a high level response is equivalent to that which the body undergoes as a reaction to significant trauma or injury.

A hallmark of the present invention(s) is the previously unappreciated connection between the reduction in oxygen concentration experienced in-flight and the increased blood clotting factors that result and which ultimately impact the incidence of deep vein thrombosis suffered as a result of airline travel.

The invention also addresses fatigue, comfort and physiological stress issues which result from the practical limitations of aircraft pressurization systems, which existing oxygen delivery and control systems are either incapable of addressing or are not suitably configured.

SUMMARY OF INVENTION

In exemplary embodiments, the present invention takes the form of an apparatus and method for controlling the oxygen concentration in aircraft cabins and non-habitable areas by proportionately increasing the oxygen content of the air going to the cabin while at the same time proportionately decreasing the oxygen content of air going to non-habitable areas. The apparatus incorporates redundant oxygen and pressure sensors to monitor the oxygen concentration in the cabin air. Oxygen content is continually monitored and adjusted to achieve and maintain an atmosphere in the passenger cabin that is sufficiently oxygen enriched to address the oxygen related impacts of reduced air pressure, while limiting the degree of oxygen enrichment to prevent the creation of an atmosphere that increases material flammability above safe and certifiable levels. At the same time, the apparatus continually monitors the oxygen content in non-habitable pressurized areas to maintain an atmosphere with reduced ability to sustain combustion, and to allow storage of a nitrogen cache for use in re-balancing the cabin oxygen/nitrogen balance to natural levels in case of smoke/fire detection in the cabin.

The invention alters the gas composition of the cabin air to increase the partial pressure of oxygen. The increased partial pressure of oxygen is achieved without altering the cabin air pressure or the differential pressure between the interior and exterior of the fuselage, and without increasing the overall content of oxygen inside the pressure vessel of the aircraft. The cabin partial pressure of oxygen is monitored and adjusted continuously to provide the desired atmospheric oxygen enrichment while preventing the creation of an atmosphere which increases material flammability in the cabin above FAA approved levels. In this regard, it should be pointed out that the concentration of oxygen will always be less than that encountered naturally at sea level, and therefore an inherently acceptable concentration for safe operation.

In at least one embodiment, the generation of oxygen has as a byproduct thereof the generation of flame-inhibiting nitrogen. In another aspect of the present invention(s), this byproduct-nitrogen is supplied to areas and/or compartments of the aircraft particularly susceptible to fire hazards. For instance, the nitrogen can be injected into the cabling ducts, baggage compartment, radio rack compartments, as well as other areas where electrical wiring and other high-fire-risk assemblies are concentrated. The nitrogen may also be reservoired for distribution to burning or smoldering areas should onboard combustion occur. In a further aspect, the current invention contemplates providing the capability for rapidly inter-mixing the reservoired nitrogen into the raised oxygen concentration areas in the event that an elevated and undesirable combustion-risk condition is determined, or an actual combustion situation is detected or otherwise signaled.

As an adjunct to the nitrogen-based fire inhibiting arrangement and method, it is further contemplated that smoke and fire sensors can be advantageously placed in return air ducts of the aircraft thereby enabling earlier detection and extinguishment than current systems allow.

Further features and advantages of the present invention will be presented in the following detailed description of a preferred embodiment of the invention.

BRIEF DESCRIPTION OF DRAWINGS

FIG. 10 is a O2/N2 control logic/function table demonstrating various system responses to an array of input variables.

DETAILED DESCRIPTION

Figure 1:
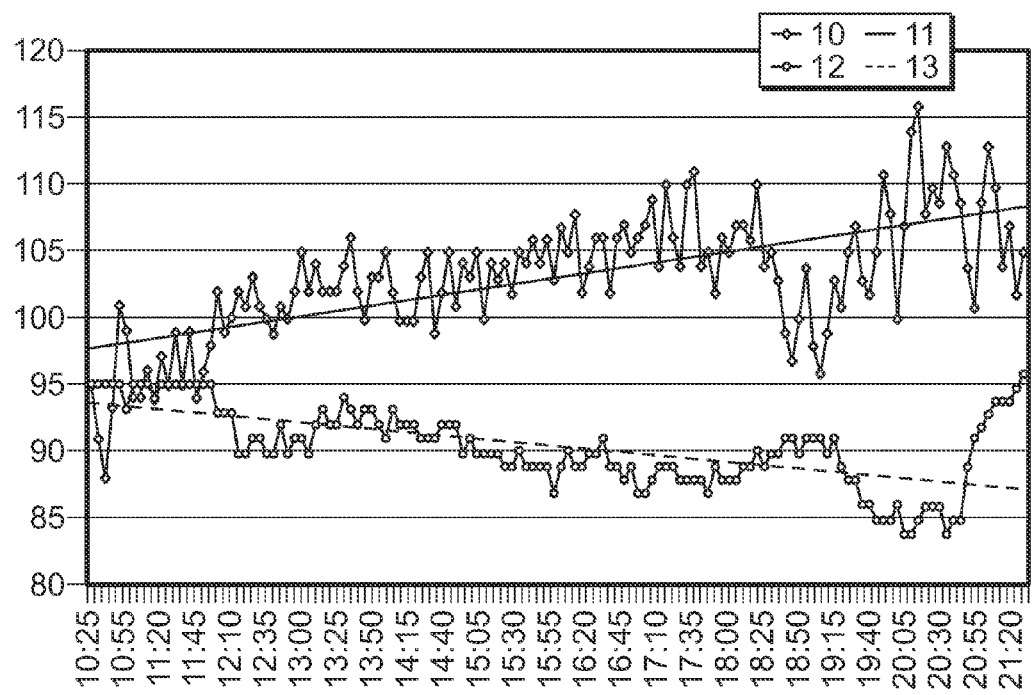
FIG. 1 is a graphical representation of oxygen saturation compared to corresponding pulse rates of a subject take at the indicated time intervals on a MD11 aircraft flying from London, UK to Atlanta, US.
Figure 2:
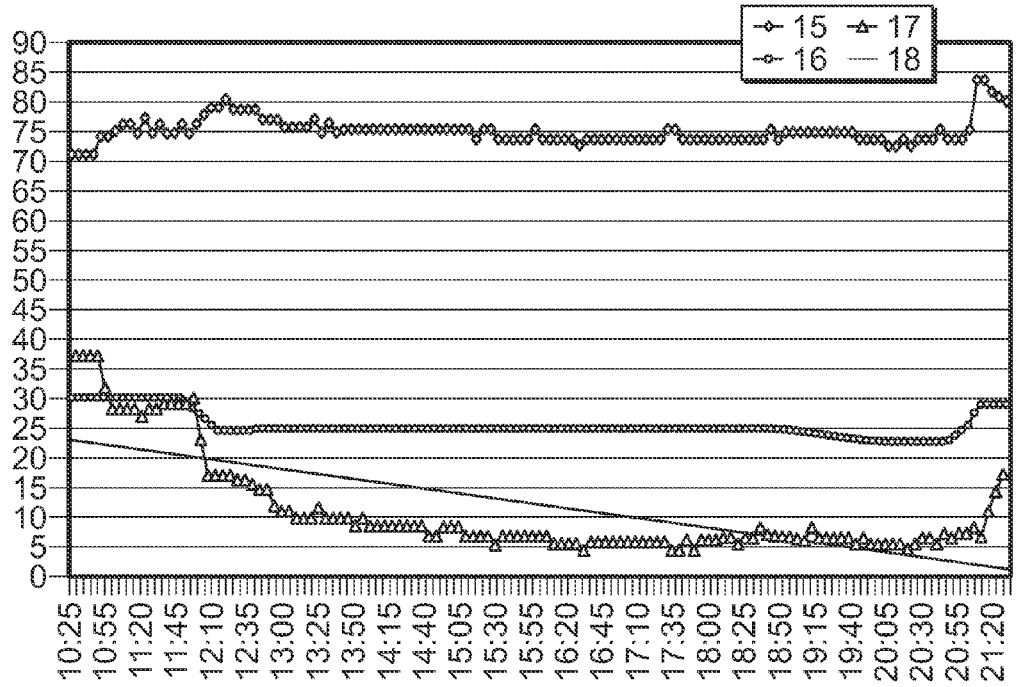
FIG. 2 is a graphical representation corresponding to FIG. 1, but in which temperature, pressure and RH (%) are comparatively demonstrated.
Figure 3:
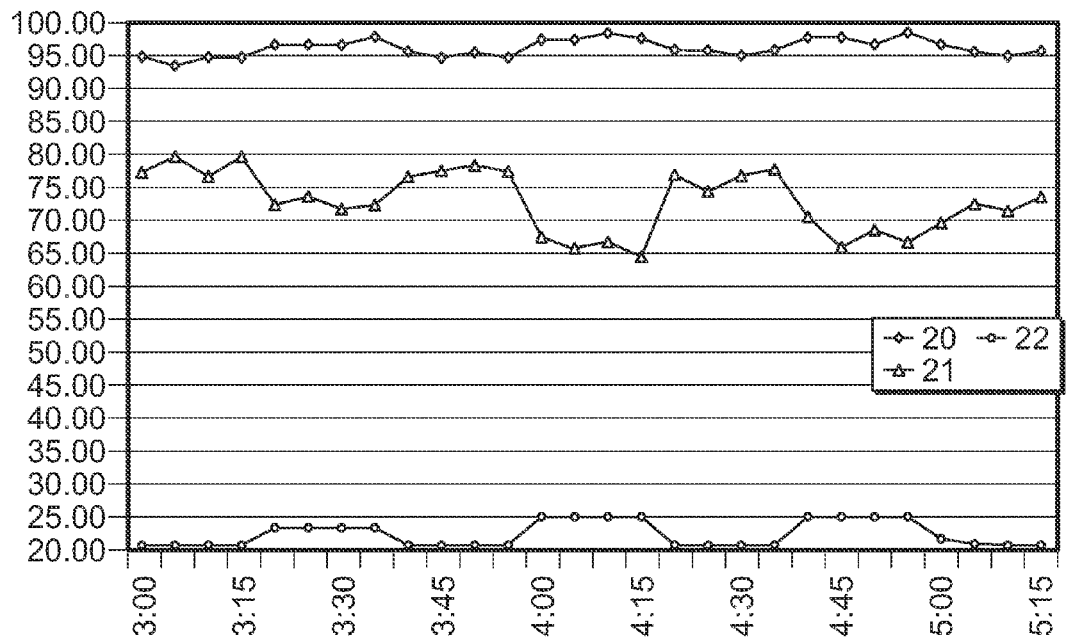
FIG. 3 is a graphical presentation of a subject's pulse rate in response to varying oxygen saturation levels and compositional percentages at sea level.

FIGS. 1 and 2 graphically demonstrate easily monitored physiological reactions to airline flight. In the example of FIG. 1, a subject's heart rate 10 (linearized 11) is compared to experienced oxygen saturation levels 12 (linearized 13). Further details of the experienced cabin environment are illustrated in FIG. 2 where temperature 15, pressures 16 and relative humidity 17 (linearized 18) are tracked with respect to time for the trip of FIG. 1. The relationship of increasing heart rate to decreasing oxygen saturation levels is readily appreciated. This significant bodily reaction, however, goes substantially unnoticed by the passenger. A similar reaction is shown at sea level in FIG. 3 where heart rate 21 clearly tracks oxygen content (percentage basis 20, saturation basis 22) in the air.

Therefore, as described above, in one aspect the present invention constitutes raising the atmospheric concentration of oxygen within aircraft occupant compartments, without increasing pressurization. Several different systems and technology are contemplated as suitable for increasing cabin oxygen concentration levels. In a most rudimentary sense, bottled oxygen can be utilized, but certain drawbacks are appreciated such as increased weight and onboard space occupation that such systems would require. Functionally, however, such systems would be acceptable. Liquid oxygen also serves as a suitable supply, but for commercial use is likely impractical and not cost-effective.

The preferred systems for providing oxygen for increasing concentration levels within aircraft occupant cabins are those which produce high concentration oxygen via separation from available atmospheric air. Examples include membrane filter methods, electro-chemical methods, superconducting magnetic screens, and molecular sieves, among others. Particularly preferred is the molecular sieve method in which oxygen is physically separated from the other constituent components of ambient air.

In an exemplary embodiment of such molecular sieves, zeolite material is formed into a bed through which pressured ambient air is forced. As a result, oxygen is permitted to pass therethrough, while other components of the air, primarily nitrogen (but also carbon dioxide and water), are held back and absorbed in the zeolite bed via molecular absorption. As will be appreciated by those persons skilled in this art, the bed will become saturated and have to be purged of the absorbed components. This may be accomplished in a number of ways, but that which is most common is to relieve the imposed pressure and permit the absorbed gases to defuse from the zeolite material.

Figure 4:
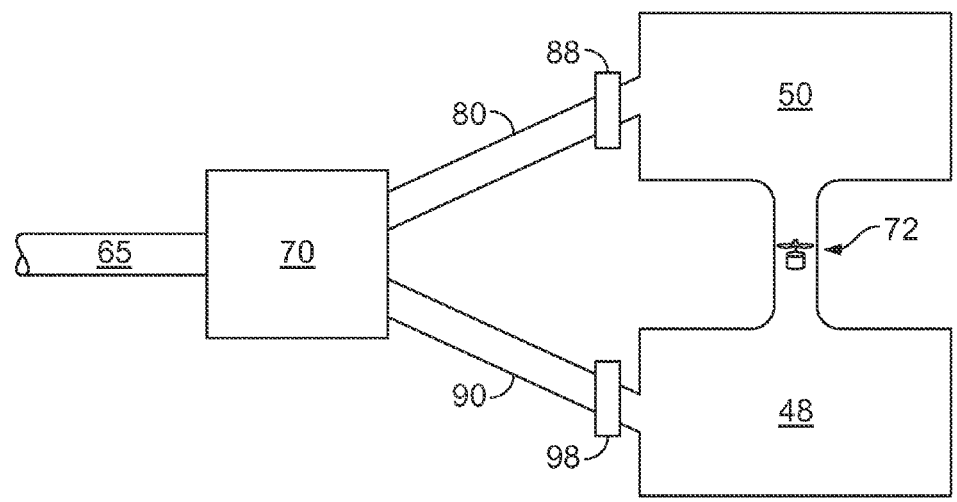
FIG. 4 is a highly simplified schematic representation of an exemplary system configured according to one embodiment of the present invention in which nitrogen and oxygen are separated and reservoired in segregated areas, but with a rapid re-mixing capability between the reservoirs.

Because of the low-pressure environment in which aircraft operate, certain airborne molecular sieve air separators depend on the ability to purge the sieve beds overboard in order to expose them to the low pressure atmosphere. This method results in the purged gas not contributing to pressurization, and being unavailable for use as a nitrogen rich stream. Another aspect of the present invention includes a means to create the required low pressure bed exposure without ducting the purge gas overboard thereby also creating a nitrogen-rich byproduct. A highly simplified example of such a system's installation on an aircraft is illustrated in FIG. 4.

According to one aspect of the present invention, the produced high-oxygen concentration air is distributed in the air supply to the occupant cabin(s). Based on appropriately positioned oxygen concentration sensors, the system adjusts for maintaining the specified level(s) within the cabin(s). Still further, the byproduct of nitrogen-rich gas is dispensed to those regions for which increased flammability retardation is desirable. Schematically, this is demonstrated in FIG. 4 where an air supply is introduced through an intake air duct 65 to a gas separator 70 where high concentration oxygen and nitrogen are produced. The oxygen enriched air flow or supply 80 is conveyed to the passenger cabin 50 while the nitrogen enriched air flow or supply 90 is directed to compartments 48 having heightened flammability risks. Check valves 88 and 98 are provided to establish one-way conduction of the enriched flows 80 and 90.

An inter-compartment air mixer is shown as a fan 72. This feature is provided to enable rapid remixing of the enriched gases in the event that conditions in the oxygenated passenger cabin are detected which indicate that a reduced-flammability environment is desirable. One obvious example is the detection of combustion or smoke in the oxygenated cabin.

Figure 5:
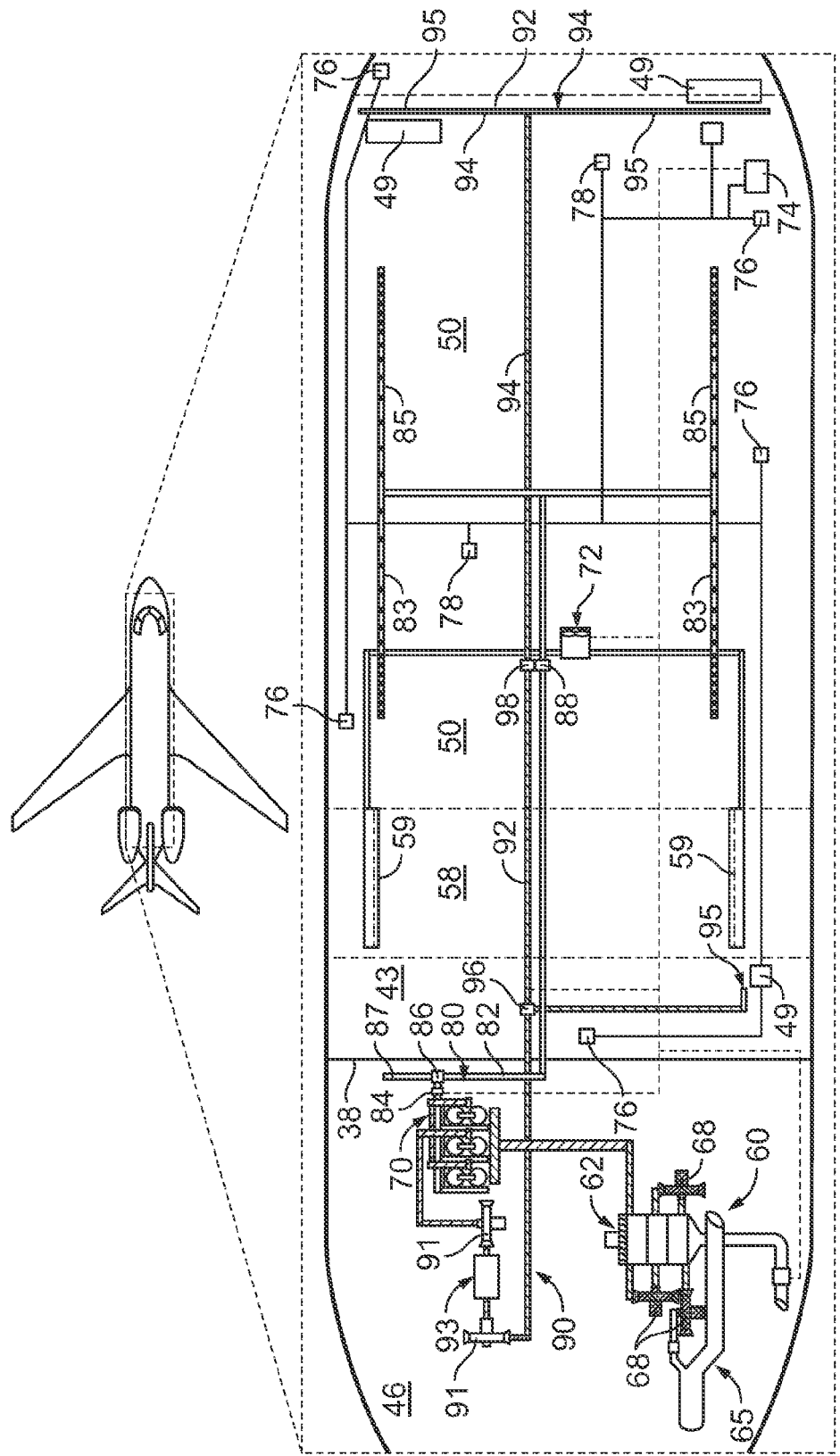
FIG. 5 is a schematic plan view representation of an exemplary system configured according to the present invention and shown positioned within an aircraft fuselage.
Figure 6:
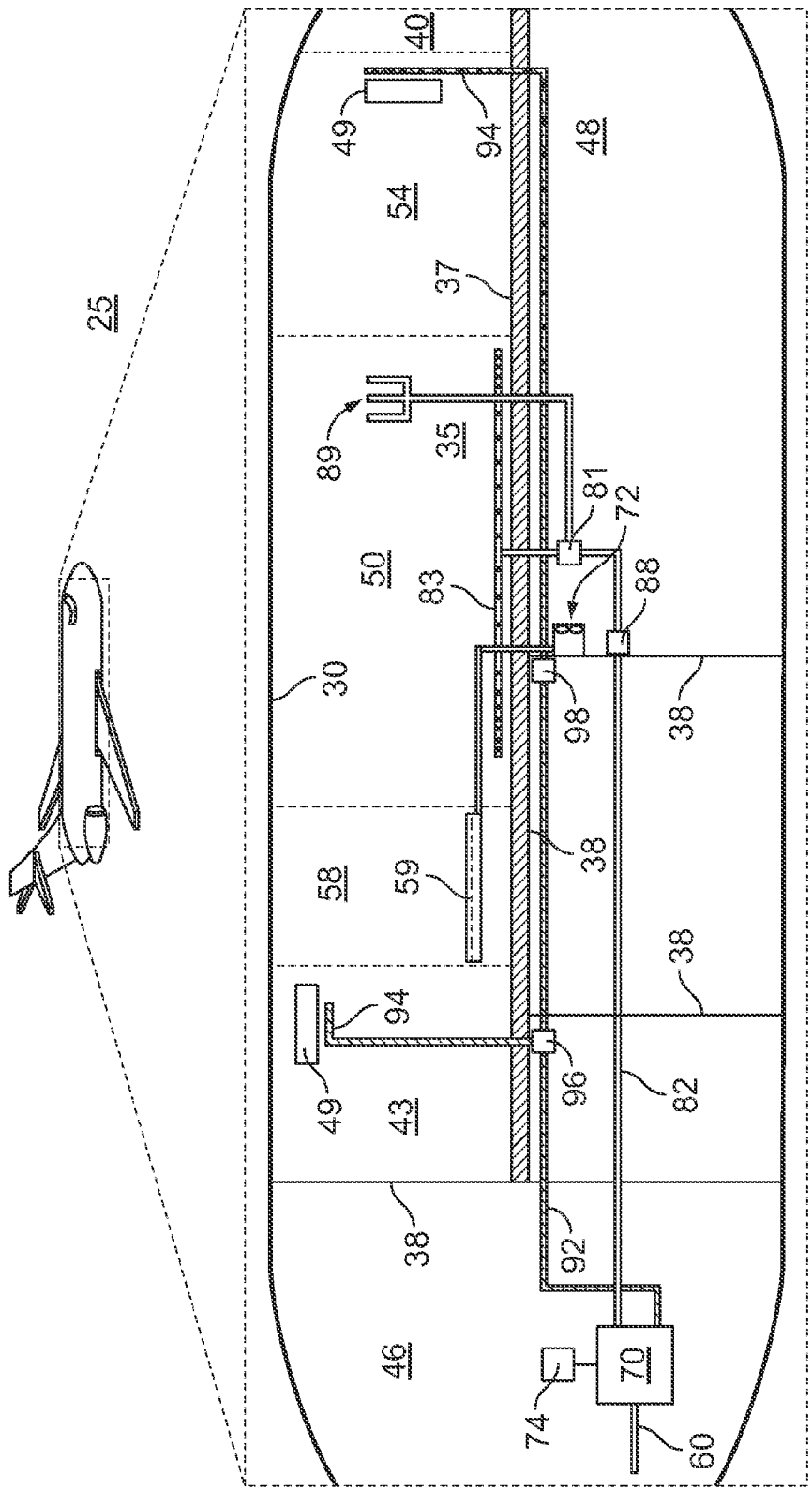
FIG. 6 is a schematic elevational view representation of a system corresponding generally to that illustrated in FIG. 5.
Figure 7:
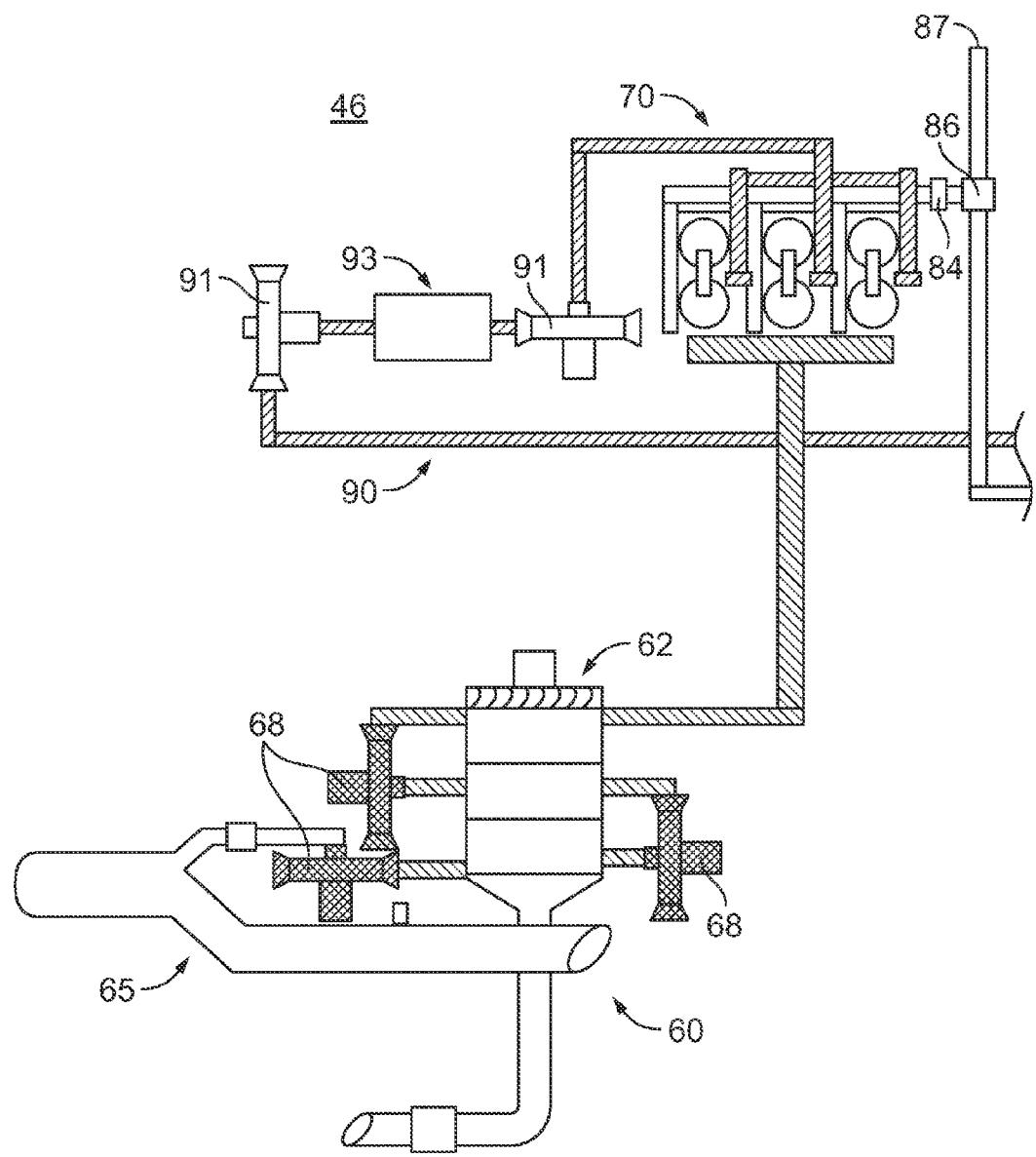
FIG. 7 is a detail schematic view of an exemplary gas separator suitable for utilization in the present invention.

FIGS. 5 and 6 illustrate plan and elevational views, respectively, of an exemplary aircraft in which the presently disclosed invention(s) may be employed. An aircraft interior 35 is defined within a fuselage 30 flying in an ambient-air environment 25. On a macro level, a floor 37 defines several above-floor cabins including the cockpit 40, vestibule 54, occupant/passenger cabin 50, and lavatory/galley area 58. A baggage compartment 43 is provided behind the occupiable cabins, but within the pressured zone, and which is often inaccessible from the cabin during flight.

A non-pressured tail compartment 46 is shown behind a pressure barrier 38 and houses primary components of the on-board gas processing plant. A gas separation unit 70 is depicted and to which an air supply 60, typically from one of the powering engines, is directed. This engine-warmed air (exemplarily 480 degrees F.) is expanded causing a temperature drop to, for example, 32 degrees F. at an intake duct 65. The pressure of this supplied air is then raised utilizing a series of pressure blowers 68, between which heat exchangers are utilized to reduced the temperature-elevated pressured air flows.

The pressured air is then processed at the separator 70 where high-concentration oxygen 80 and nitrogen 90 flows are generated. The nitrogen is drawn off using suction pumps 91, between which heat exchangers 93 are utilized to keep the temperature of the nitrogen enriched air within manageable ranges.

The distributed flow rate of oxygen enriched air 80 is computer-controlled via a variable pass-through valve 84. The oxygen enriched air 80 may be directed forward in the aircraft 30 through duct 82 or dumped overboard through port 87 depending upon the configuration of shuttle valve 86. The duct 82 is arranged below the floor 37 and passes through both pressured and non-pressured zones across pressure barrier walls 38. A check valve 88 assures unidirectional oxygen flow in the duct 82. Switch valve 81 determines whether the oxygen enriched air supply 80 is directed up past the floor and into the regular air distribution ducts of the passenger cabin, or is diverted to an individual, tube-based, direct passenger mask distribution system 89.

Figure 8:
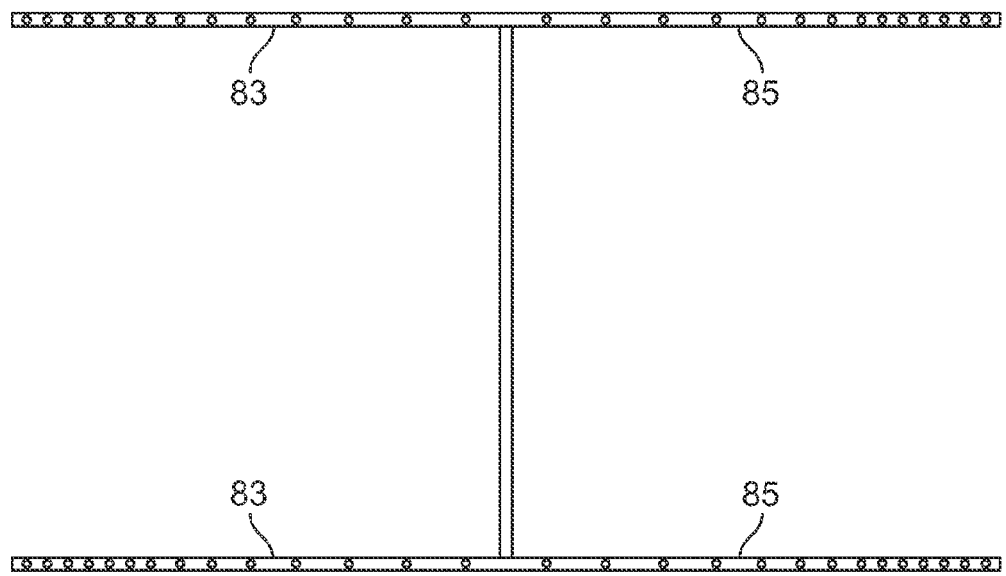
FIG. 8 is a detail schematic view of an exemplary oxygen distribution duct, including the end portions taking the form of piccolo tubes.

In the event that the oxygen enriched air is conveyed to the air distribution ducts in the occupant cabins, piccolo tube(s) 83 are utilized having a series of apertures or distribution ports 85 of continuously decreasing spacing. As depicted in FIG. 8, the spaced configuration of the apertures assures substantially even distribution of oxygen enriched air to the intended cabin areas.

Figure 9:
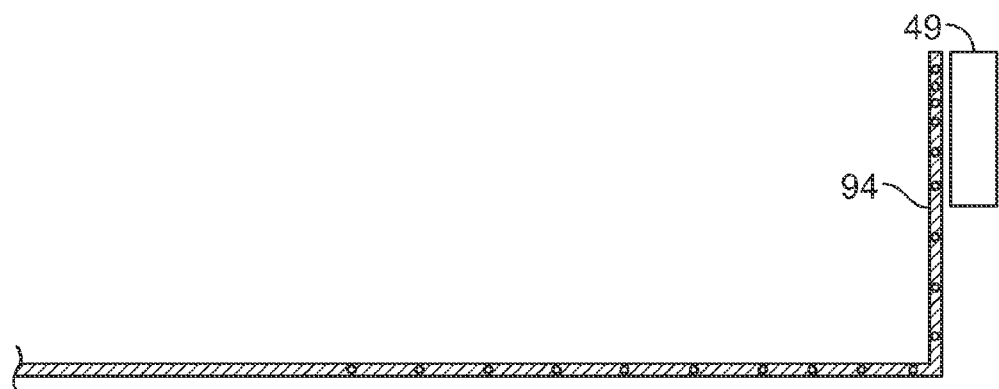
FIG. 9 is a detail schematic view of an exemplary nitrogen distribution duct, including the graduated piccolo tubes.

The produced nitrogen enriched air flow 90 is similarly conveyed forward in the craft via a check-valve 98 controlled distribution duct 92, and variously dispensed to desirable locations. As can be best appreciated in FIGS. 6 and 9, nitrogen enriched air is distributed to the below-floor compartment where it is essentially reservoired, as well as more directly to such areas as the radio bays 49. Again, piccolo tube(s) 94 are utilized having a series of apertures or distribution ports 95 of continuously decreasing spacing. Still further, diversions of nitrogen enriched air can be effected by manipulation of control valve(s) 96 in order to increase/decrease application of nitrogen enriched air, on demand. For instance, if a combustion situation is detected in the aft radio bay 49 in the baggage compartment 43, a greater amount, or perhaps all of the produced nitrogen may be desirably dumped 97 at the radio rack 49.

Generally, the direction of air flow in the craft 30 is aft, forward. In order to divert odors out of the lavatory/galley area 58 and away from the passenger cabin, exhaust air ducting 59 is connected with the exhaust fan 72. The withdrawn air is dumped below the floor deck 37 into the nitrogen enriched compartment. Advantageously, the exhaust fan 72 can be strategically reversed in order to rapidly introduce nitrogen enriched air into the passenger cabin in the event that a lower oxygen concentrate environment is desired. This feature may also be referred to as remixing.

It is contemplated that the control of the oxygen/nitrogen system may be automated, at least in part, under the direction of a computer-based controller 74. In at least one aspect, information can be obtained utilizing above-floor 76 and below-floor 78 oxygen partial pressure sensors. Based on appropriate algorithmic processing of available data, the several control valves of the system can be variously manipulated based on determined requirements. Exemplary strategies of the computer-based controller 74 are depicted in the O2/N2 logic/function table of FIG. 10 that demonstrates various system responses to an array of input variables. In the O2/N2 logic/function table of FIG. 10, input variables in the first seven columns represent: Cabin Smoke Detected (CSD), Baggage Smoke Detected (BSD), Underfloor Smoke Detected (USD), Weight On Wheels (WOW), Supplemental Oxygen Supply mode (SO2), Oxygen partial pressure greater than or equal to Target (PpO2=/>Target), and Cockpit Switch On (Ckpt Sw On), and the eighth column (Function) represents the various system responses to the input variables listed in the first seven columns. "Separators on" means not only that the separators are turned on, but also that the air supply diverting valve, the RAM air tap, etc. are configured for separator operation. "Separators off" means that the separators are turned off when WOW except when the SO2 option installed and active. In the Supplemental Oxygen Supply mode (SO2), passenger O2 mask source is switched to separator output from stored oxygen to extend the "at altitude" duration when unable to maintain high enough cabin pressure for unassisted breathing beyond that achievable with stored oxygen.

With respect to such zeolite-based molecular sieve systems, certain improvements in their performance and construction are also contemplated. As an example, because zeolites are temperature sensitive, one aspect of the present invention includes changing the temperature of the zeolite bed, preferably by heating, during the purge cycle to enhance release of the absorbed components, the same being primarily nitrogen. Similarly, in another embodiment, an electrical charge can be imposed on the zeolite bed, altering the molecular sieve-effects. In this context, it is appreciated that the magnitude of the charge may be made variable so that the characteristics of a particular bed can be manipulated.

We claim:

1. A method for controlling a degree of oxygen/nitrogen shift of incoming air in response to a partial pressure of oxygen in areas of an aircraft, said method comprising:
   separating oxygen from ambient air onboard the aircraft to establish a high-concentration oxygen supply and separating nitrogen from the ambient air onboard the aircraft to establish a high-concentration nitrogen supply;
   determining that an increased oxygen concentration is desired in an occupant cabin, and dispensing an oxygen flow from the high-concentration oxygen supply to the occupant cabin of the aircraft to increase a level of oxygen concentration within the occupant cabin to a level greater than a naturally-occurring partial pressure of oxygen at an experienced internal cabin pressure;
   dispensing a nitrogen flow from the high-concentration nitrogen supply to a fire-susceptible, internal non-habitable region of the aircraft to decrease a capability for an atmosphere therein to support combustion; and
   determining that reduced oxygen concentration is desired in the occupant cabin; and
   dispensing into the occupant cabin nitrogen from the high-concentration nitrogen supply, thereby diluting the oxygen concentration in the occupant cabin.

2. The method of claim 1, further comprising:
   storing the high-concentration nitrogen supply in a first location prior to dispensing the nitrogen from the high-concentration nitrogen supply.

3. The method of claim 2, wherein the first location is a reservoir.

4. The method of claim 2, wherein the first location is a fire-susceptible, non-habitable area of the aircraft.

5. The method of claim 1, further comprising:
   varying the oxygen flow into the occupant cabin and the nitrogen flow into the occupant cabin based in part on a detected condition in the aircraft, wherein the detected condition is at least one of a partial pressure of oxygen value, flight parameters, aircraft configuration, and smoke/fire warning status.

6. A system for adjusting a nitrogen concentration and an oxygen concentration within areas of an aircraft, the system comprising:
   a gas separation unit to separate ambient air within an aircraft into a nitrogen enriched flow and an oxygen enriched flow;

a plurality of sensors monitoring at least one condition within at least one region of an aircraft; and a controller configured to control a dispensation of the nitrogen enriched flow and the oxygen enriched flow based in part on an output of the plurality of sensors, wherein the controller causes the dispensation of nitrogen from the nitrogen enriched flow into an occupant cabin if a reduced oxygen concentration in the occupant cabin is desired.

7. The system of claim 6, wherein the controller causes the dispensation of oxygen from the oxygen enriched flow into the occupant cabin if a higher oxygen concentration in the occupant cabin is desired.

8. The system of claim 6, wherein the controller causes the dispensation of oxygen from the oxygen enriched flow to increase the oxygen concentration within the occupant cabin of the aircraft to a level greater than a naturally-occurring partial pressure of oxygen at an experienced internal cabin pressure.

9. The system of claim 6, wherein the controller causes the dispensation of a portion of the oxygen enriched flow overboard if a reduced oxygen concentration in the occupant cabin is desired.

10. The system of claim 6, wherein the controller causes the dispensation of a portion of the nitrogen enriched flow overboard if a reduced nitrogen concentration in the occupant cabin is desired.

11. A method for controlling an atmosphere in habitable and non-habitable areas of an aircraft, said method comprising:

establishing a supply of nitrogen enriched air by separating nitrogen from air onboard the aircraft and a supply of oxygen enriched air by separating oxygen from air onboard the aircraft;

storing the supply of nitrogen enriched air in a non-habitable area; and introducing nitrogen enriched air stored in the non-habitable area into a habitable area upon determining that reduced oxygen concentration is desired in the habitable area, wherein the habitable area is habitable by passengers or crew; and introducing the oxygen enriched air into a habitable area, wherein the habitable area is habitable by passengers or crew.

12. The method of claim 11, wherein the habitable area comprises at least one of a passenger cabin, a cockpit, a lavatory, a galley, or a vestibule.

13. The method of claim 11, wherein the non-habitable area comprises at least one of: a cabling duct, a baggage compartment, a radio rack compartment, or an electrical wiring compartment.

\* \* \* \* \*